(12) United States Patent
Parra Becerra et al.

(10) Patent No.: US 10,807,508 B2
(45) Date of Patent: Oct. 20, 2020

(54) TWO-PIECE ALL-WEATHER FLOOR MAT WITH INTEGRATED SNAP-FIT LOCKING FEATURE

(71) Applicant: Ford Global Technologies, LLC, Dearborn, MI (US)

(72) Inventors: Santiago Manuel Parra Becerra, Col. Juarez los Chirinos (MX); Juan De Jesus, Cuaj Mexico City (MX); Leonardo Alonso Huitron, Naucalpan de Juarez (MX); Paul Vredeveld, Tecumseh, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 16/215,790

(22) Filed: Dec. 11, 2018

(65) Prior Publication Data

US 2019/0111822 A1    Apr. 18, 2019

Related U.S. Application Data

(62) Division of application No. 15/434,232, filed on Feb. 16, 2017, now Pat. No. 10,183,600.

(51) Int. Cl.
*B62D 25/20* (2006.01)
*B60N 3/04* (2006.01)

(52) U.S. Cl.
CPC .............. *B60N 3/044* (2013.01); *B60N 3/04* (2013.01); *B60N 3/046* (2013.01); *B60N 3/048* (2013.01)

(58) Field of Classification Search
CPC ......... A47L 23/266; B60N 3/04; B60N 3/046; B60N 3/048; Y10T 428/24182; Y10T 428/23979; Y10T 428/24008; E04F 15/105

See application file for complete search history.

(56) References Cited

U.S. PATENT DOCUMENTS

| 2,709,105 | A | * | 5/1955 | Kramer | B60N 3/042 296/97.23 |
|---|---|---|---|---|---|
| 3,337,258 | A | | 8/1967 | Steinberg | |
| 4,751,764 | A | * | 6/1988 | Reuben | B60N 3/046 16/4 |
| 4,804,570 | A | * | 2/1989 | Bedics | A47L 23/24 15/217 |

(Continued)

FOREIGN PATENT DOCUMENTS

DE    19833459 A1    4/1999

*Primary Examiner* — Kiran B Patel

(74) *Attorney, Agent, or Firm* — David Coppiellie; Brooks Kushman P.C.

(57) ABSTRACT

A multi-piece floor mat for a vehicle is provided. The floor mat includes a first section and a second section that are configured to assemble to one another to create a single floor mat assembly that spans across two or more floor regions of respective seating areas of the vehicle. The first section has a projection extending therefrom and entirely from a front edge to a rear edge thereof. The second section has a corresponding groove defined therein and extending entirely from a front edge to a rear edge thereof. The groove is configured to receive the projection to interlock the first and second floor mat sections. The projection may be provided with a stem and a bulbous head for additional securement.

14 Claims, 2 Drawing Sheets

(56) References Cited

U.S. PATENT DOCUMENTS

| | | | | |
|---|---|---|---|---|
| 6,505,444 B1* | 1/2003 | Johnson | A47L 23/24 | 52/177 |
| 6,635,331 B2* | 10/2003 | Kessler | A47L 23/26 | 428/100 |
| 7,945,992 B2* | 5/2011 | Parisi | B60N 3/046 | 16/4 |
| 8,006,443 B2* | 8/2011 | Fuccella | E04F 15/02172 | 52/177 |
| 8,722,170 B1* | 5/2014 | Brown | B32B 11/00 | 428/68 |
| 8,833,007 B2* | 9/2014 | Tillery | E04F 15/02 | 52/177 |
| 8,919,054 B2* | 12/2014 | Tillery | E04F 15/22 | 52/177 |
| D820,756 S * | 6/2018 | Alesi | D12/203 | |
| 10,059,242 B1* | 8/2018 | Willobee | B60N 3/046 | |
| 10,583,764 B1* | 3/2020 | Cavitt | B60N 3/048 | |
| 2004/0224130 A1* | 11/2004 | Melucci | B29C 43/146 | 428/156 |
| 2005/0170129 A1* | 8/2005 | Ellingson | B32B 3/14 | 428/54 |
| 2015/0274052 A1* | 10/2015 | Brown | B60N 3/048 | 428/99 |
| 2016/0229323 A1* | 8/2016 | Veik | B60N 3/046 | |
| 2016/0236603 A1* | 8/2016 | Stroud | B60N 3/046 | |
| 2017/0036582 A1* | 2/2017 | MacNeil | B60N 3/046 | |
| 2018/0086243 A1* | 3/2018 | Johnson | B60N 3/048 | |
| 2019/0126801 A1* | 5/2019 | De Jesus | B60N 3/044 | |

* cited by examiner

TWO-PIECE ALL-WEATHER FLOOR MAT WITH INTEGRATED SNAP-FIT LOCKING FEATURE

CROSS-REFERENCE TO RELATED APPLICATIONS

This application is a divisional of U.S. application Ser. No. 15/434,232 filed Feb. 16, 2017, now U.S. Pat. No. 10,183,600 issued Jan. 22, 2019, the disclosure of which is hereby incorporated in its entirety by reference herein.

TECHNICAL FIELD

This disclosure generally relates to a floor mat for a vehicle. More specifically, this disclosure relates to a two-piece floor mat in which the pieces are configured to overlap one another and lock together in the overlapping region.

BACKGROUND

Removable, all-whether floor mats in vehicles are known in the art. The floor mats can cover the floor area where the feet of the driver or passengers rest. These are typically made of a rubber-like material, such as a thermoplastic elastomer (TPE). This gives the floor mats an all-whether property, protecting the cloth or fabric material beneath from dirt, snow, mud, water, etc.

SUMMARY

According to one embodiment, a floor mat for a vehicle includes a first section having a projection extending downward therefrom and extending entirely from a front edge to a rear edge thereof. The floor mat also includes a second section having a groove defined therein and extending entirely from a front edge to a rear edge thereof. The groove is configured to receive the projection to interlock the first and second floor mat sections.

In another embodiment, a vehicle floor mat has a front and a rear edge. A first mat has a first flat region, a second flat region, and a raised region therebetween. The first mat is configured to accommodate a corresponding raised region of a vehicle floor. A second mat is configured to interlock with the second flat region. The second flat region or the second mat includes a projection extending from the front edge to the rear edge.

In yet another embodiment, a vehicle includes a floor, and a first mat overlaying a first section of the floor. The first mat has a projection that includes a stem having a first width and a head having a second width exceeding the first width. The vehicle includes a second mat overlaying a second section of the floor and having a groove with a first region having a first width and a second region having a second width exceeding the first width.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
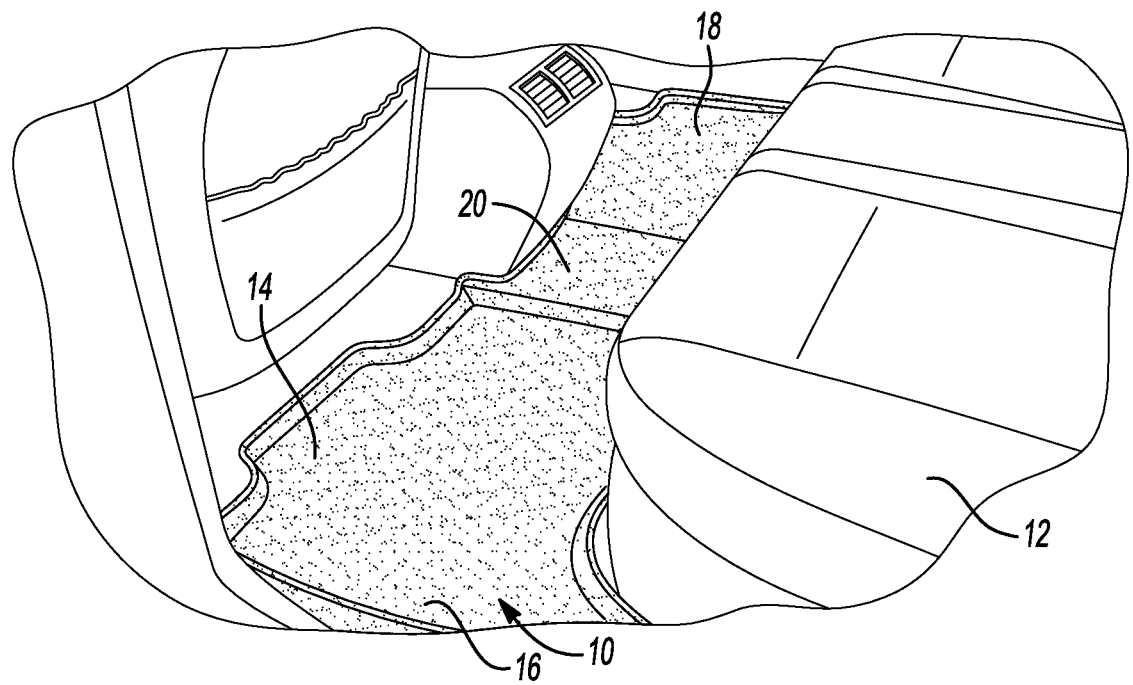
FIG. 1 is a perspective view of a floor region of a rear seating row in a vehicle.
Figure 2:
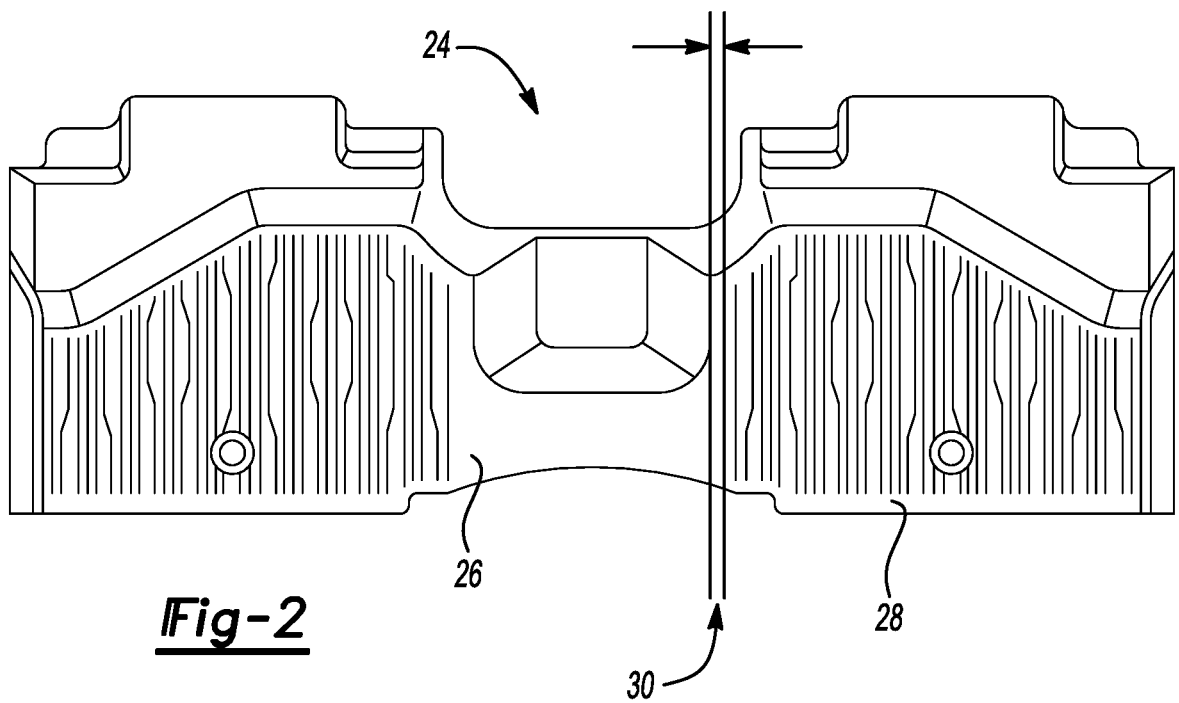
FIG. 2 is a top view of a floor mat, according to one embodiment in which the floor mat comprises two pieces that interconnect at an overlap region.

FIG. 1 is a perspective view a floor region 10 of a rear seating row in a vehicle. The floor region 10 in this embodiment is for a second row of seats 12, but can also be for a third row of seats. The floor region 10 includes an all-whether floor mat 14. The floor mat can be made of a rubber or thermoplastic elastomer (TPE) material to protect the cloth material underneath. The floor mat generally spans substantially across the width of the interior of the vehicle to assure proper protection of as much of the flooring material as possible.

The floor mat 14 has a left side 16, a right side, 18, and a central region 20. The central region 20 is raised with respect to the left side 16 and right side 18 to accommodate for a corresponding raised region or tunnel in the floor itself. The raised region of the floor is typically raised to accommodate powertrain components beneath, for example.

In order to cover the floor region 10 of the second row or third row, floor mats are typically manufactured as a one part. However, this makes installation of the floor mat difficult due to its large size, and also creates ergonomic problems during assembly. Other floor can be separated, creating two mats which overlap at a specific joint area. However, a simple overlap joint has the risk of being moved out of position during customer use; which will cause a poor fit and will leave the carpet exposed to liquid leaks, dust, and mud that affect the appearance of the interior of the vehicle.

According to various embodiments of the present disclosure, a two-piece floor mat 24 is provided in which both pieces snap-fit together, as shown in FIGS. 2-5. The floor mat 24 includes the properties as the floor mat 14 described above, except that the mat is two-pieces that snap-fit together as will be described below.

The floor mat 24 includes a left-hand (LH) mat 26 or LH section and a right-hand (RH) mat 28 or RH section. The LH mat 26 spans the floor of the left seat, and also spans over the central raised region, while the RH mat 28 spans only the floor of the right seat. The LH mat 26 overlaps the RH mat 28 at an overlap region 30. The size of each of the LH and RH mats is but one embodiment, and it is contemplated that the RH mat can be the larger of the two mats, spanning over the central region. However, the overlap region 30 may be preferable in some embodiment to be located at a junction between the raised region and one of the LH and RH mats. This places the overlap region of the two mats in an inconspicuous and unnoticeable place for aesthetic purposes.

The overlap region 30 defines a snap-fit feature or zip joint 32. In one embodiment, the LH mat 26 has two male locking features 34, 36 that protrude from the underside of the LH mat 26 toward the underlying RH mat 28. The male locking features 34, 36 may be parallel to one another and may extend from a front edge entirely to a rear edge of the LH mat 26. The RH mat 28 has two corresponding female locking features 38, 40 that are cavities or grooves defined into the upper surface of the RH mat 28. The female locking features 38, 40 may be parallel to one another and may extend from a front edge entirely to a rear edge of the RH mat 28.

In one embodiment, each male locking feature 34, 36 includes a stem 44 and a bulbous head 46. The width of the head is greater than the width of the stem 44. The head 46 may be flat on its bottom to increase surface area contact with the female locking features 38, 40. The head 46 may be oblong relative to the stem 44. Each female locking feature 38, 40 can have a corresponding narrow region 48 of the cavity to receive the stem 44, and a widened region 50 of the cavity to receive the head 46. The rubber material of the mat provides flexibility such that the material of the RH mat can flex and open wide enough to receive the male locking features 34, 36 and then return to their normal positions once the male locking features 34, 36 are received. The stem 44 may have a width that exceeds that of the narrow region 48 of the cavity when the RH mat is in a normal, unbiased position (e.g. when the LH mat is not connected to the RH mat). When the connection between the mats is made, the stem 44 may press against the narrow region 48 and expand the narrow region 48 to take a wider profile than its normal, unbiased width.

In one embodiment, each of the male locking features 34, 36 and the female locking features 38, 40 are integrally formed with the respective mats during the manufacturing process.

Figure 3:
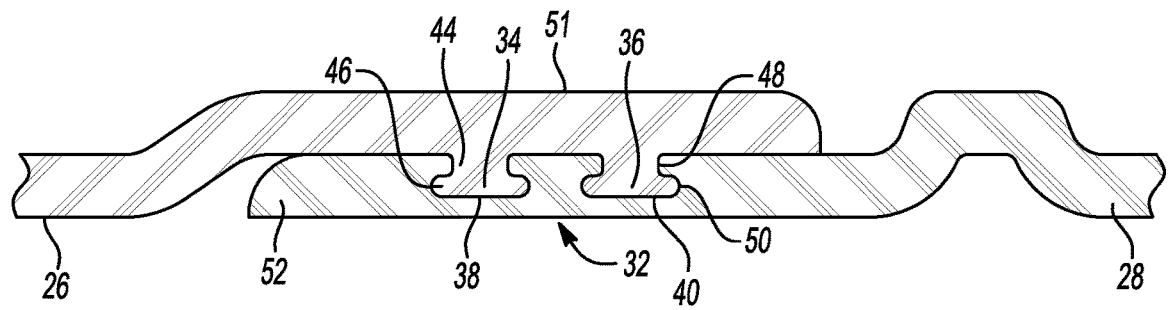
FIG. 3 is a cross-sectional view of the overlap region showing the connection between the two pieces of the floor mat, according to one embodiment.
Figure 4:
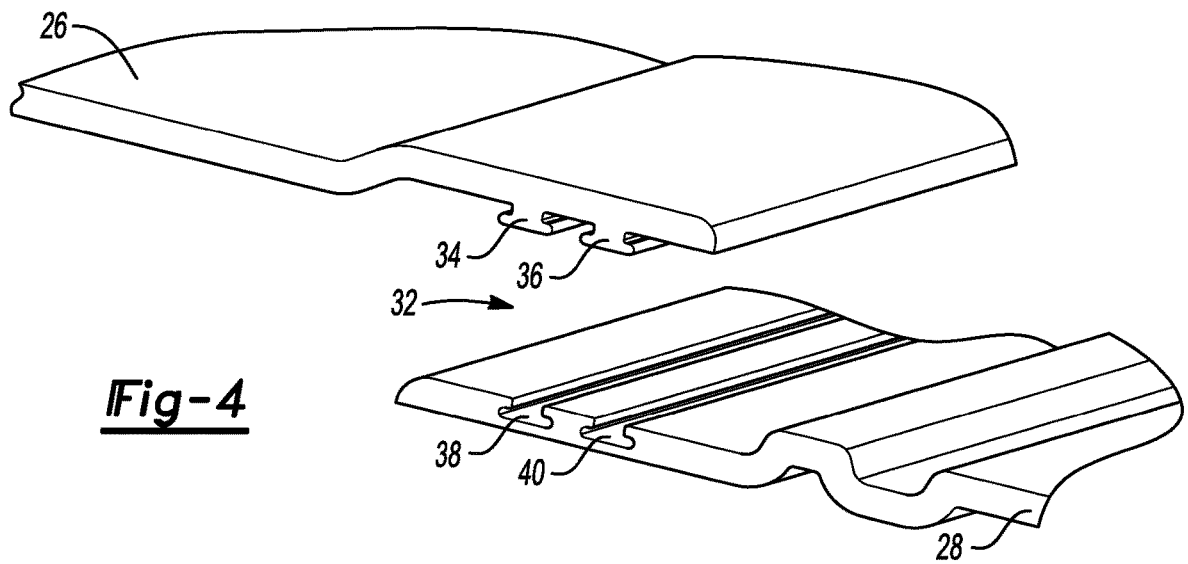
FIG. 4 is a perspective exploded view of the two floor mat pieces in a disassembled state, according to one embodiment.
Figure 5:
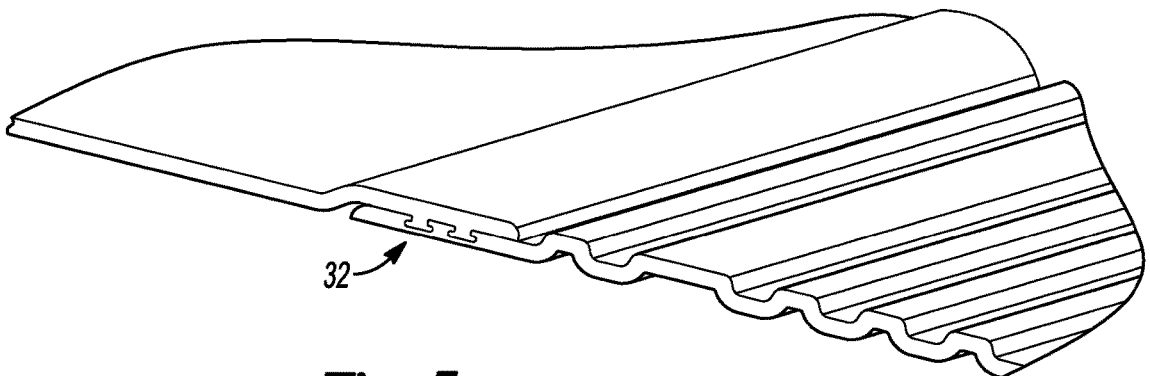
FIG. 5 is a perspective view of the two floor mat pieces in an assembled state, according to one embodiment.

As shown in FIGS. 3-5, each male locking feature 34, 36 and each corresponding female locking feature 38, 40 can span the entire length of the overlap region 30 (i.e., from the edge of the mat facing the front of the vehicle to the edge of the mat facing the rear of the vehicle.) This provides a secure attachment throughout and minimizes the chance of inadvertent unlocking.

The LH mat 26 can include a flat region 50 above the male locking features 34, 36. This provides a surface for receiving pressure from the hands of a user when the mats are locked together. This flat region 51 can be raised relative to an adjacent area of the LH mat 26. The RH mat 28 can include a corresponding flat region 52 beneath the female locking features 38, 40.

To assemble the LH mat 26 to the RH mat 28, a user can push or press the LH mat 26 downward into the RH mat 28 at the overlap region 30. This causes the male locking features 34, 36 to force into the corresponding female locking features 38, 40; either the male locking features or the female locking features will temporarily deform to accommodate the insertion of the male locking features into the female locking features. Once the LH mat 26 is interlocked with the RH mat 28 at a particular point in the overlap region 30, the user can then slide his hand along the flat region 50 of the LH mat 26 while providing downward pressure to ensure proper assembly of the LH mat 26 and the RH mat 28. This causes the male locking features 34, 36 to slide into engagement with the female locking features 38, 40 as the user's hand is slid along the flat region 50.

The embodiments described above and shown in the figures are but one embodiment, and this disclosure contemplates several variations. For example, the RH mat can be larger than the LH mat, with the overlap region being on the left-hand side of the central raised region of the mat. Furthermore, the male locking features can protrude upward from the underlying mat (instead of downward from the overlying mat), and the female locking features can be defined in the floor mat that lays on top (instead of being defined in the floor mat that lays beneath).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A floor mat for a vehicle, comprising:
    a first section having a projection extending downward therefrom and extending from a front edge to a rear edge thereof; and
    a second section having a groove defined therein and extending from a front edge to a rear edge thereof;
    wherein the groove is configured to receive the projection to interlock the first and second sections.

2. The floor mat of claim 1, wherein the projection includes a stem having a first width and a head having a second width that exceeds the first width.

3. The floor mat of claim 2, wherein the groove includes a narrowed region sized to receive the stem and a widened region sized to receive the head.

4. The floor mat of claim 1, wherein the first section includes a flat surface and the projection includes an oblong head spaced from the flat surface.

5. The floor mat of claim 1, wherein the projection is a first projection and the groove is a first groove, the first section includes a second projection identical to the first projection, and the second section includes a second groove identical to the first groove.

6. The floor mat of claim 1, wherein the first section is sized to be laid over a central raised region of a vehicle floor.

7. The floor mat of claim 1, wherein the projection is uniform from the front edge to the rear edge of the first section.

8. The floor mat of claim 1, wherein the projection and the groove extend entirely from the front edge to the rear edge.

9. A vehicle comprising:
a floor;
a first mat overlaying a first section of the floor and having a projection that includes a stem having a first width and a head having a second width exceeding the first width; and
a second mat overlaying a second section of the floor and having a groove with a first region having a first width and a second region having a second width exceeding the first width.

10. The vehicle of claim 9, wherein the first mat includes a front edge and a rear edge, and the projection extends from the front edge to the rear edge.

11. The vehicle of claim 9, wherein the first mat overlays the second mat and the projection extends downward into the second mat.

12. The vehicle of claim 9, wherein the head is oblong and includes a pair of opposing rounded edges on either side of the stem.

13. The vehicle of claim 9, wherein the first width of the groove is normally less than the first width of the stem when the second mat is unattached from the first mat, and the second mat flexes such that the first width of the groove widens when receiving the stem.

14. The vehicle of claim 9, wherein the projection is a first projection and the groove is a first groove, the first mat includes a second projection extending parallel with the first projection, and the second mat includes a second groove extending parallel with the first groove.

* * * * *